United States Patent
Park et al.

(10) Patent No.: US 6,650,693 B1
(45) Date of Patent: Nov. 18, 2003

(54) COMPLEX TYPE CORRELATOR IN CDMA SYSTEM AND INITIAL SYNCHRONIZATION ACQUIRING METHOD USING THE SAME

(75) Inventors: Jae Hong Park, Seoul (KR); Woo Jae Lee, Seoul (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/503,382

(22) Filed: Feb. 14, 2000

(30) Foreign Application Priority Data

Mar. 22, 1999 (KR) .......................................... 1999-9591

(51) Int. Cl.[7] .................................................. H04B 1/69
(52) U.S. Cl. ........................ 375/149; 375/343; 370/512
(58) Field of Search ................................. 375/147, 149, 375/150, 152, 340, 343, 365, 366, 367; 370/335, 342, 350, 509, 511, 512, 513, 515, 441, 479

(56) References Cited

U.S. PATENT DOCUMENTS

| | | | | |
|---|---|---|---|---|
| 5,184,135 A | * | 2/1993 | Paradise | 342/149 |
| 5,663,983 A | * | 9/1997 | Lin | 375/152 |
| 5,680,414 A | * | 10/1997 | Durrant et al. | 375/150 |
| 5,768,306 A | | 6/1998 | Sawahashi et al. | |
| 5,956,367 A | * | 9/1999 | Koo et al. | 375/149 |
| 5,960,048 A | * | 9/1999 | Haartsen | 375/366 |
| 6,088,382 A | * | 7/2000 | Maru | 375/142 |
| 6,263,011 B1 | * | 7/2001 | Paik et al. | 375/149 |
| 6,385,180 B1 | * | 5/2002 | Maru | 370/335 |
| 6,411,610 B1 | * | 6/2002 | Li et al. | 370/335 |
| 6,470,000 B1 | * | 10/2002 | Burns et al. | 370/342 |

* cited by examiner

*Primary Examiner*—Chi Pham
(74) *Attorney, Agent, or Firm*—Merchant & Gould

(57) ABSTRACT

An correlator for acquiring initial synchronization and initial synchronization acquiring method using the same by means of signals to be transmitted from receiving stages of a base station and a mobile station in a CDMA system is disclosed. The correlator includes a plurality of shift registers that each shift received spread signals, a plurality of multipliers that each multiply the shifted spread signal by each pseudo random code stored therein, an adder that adds the multiplied results from the multipliers, and an accumulating adder that adds in recursive pattern the added result from the adder over a predetermined times. Accordingly, the present invention has the effect that reduces initial synchronization time while realizing simple structure.

3 Claims, 4 Drawing Sheets

COMPLEX TYPE CORRELATOR IN CDMA SYSTEM AND INITIAL SYNCHRONIZATION ACQUIRING METHOD USING THE SAME

FIELD OF THE INVENTION

This invention relates to a correlator for acquiring initial synchronization and initial synchronization acquiring method using the same from signals to be inputted to receiving stages of a base station and a mobile station in a Code Division Multiple Access (CDMA) system, and more particularly to a complex type correlator in the CDMA system and initial synchronization acquiring method using the same which uses an active type correlator together with a passive type correlator.

BACKGROUND OF THE INVENTION

Generally, a pilot channel may be interchanged between receiving stages of a base station and a mobile station in the CDMA system to lock initial synchronization. At this time, a spread signal may be loaded on the pilot channel, the spread signal being composed of 64 chips or 128 chips per one bit. Also, the spread signal is logically multiplied by a pseudo random code, then the multiplexed result is added over a predetermined times, in which the initial synchronization may be acquired from a maximum added value by means of a correlator.

The correlator may be classified into an active correlator and a passive correlator.

Figure 1:
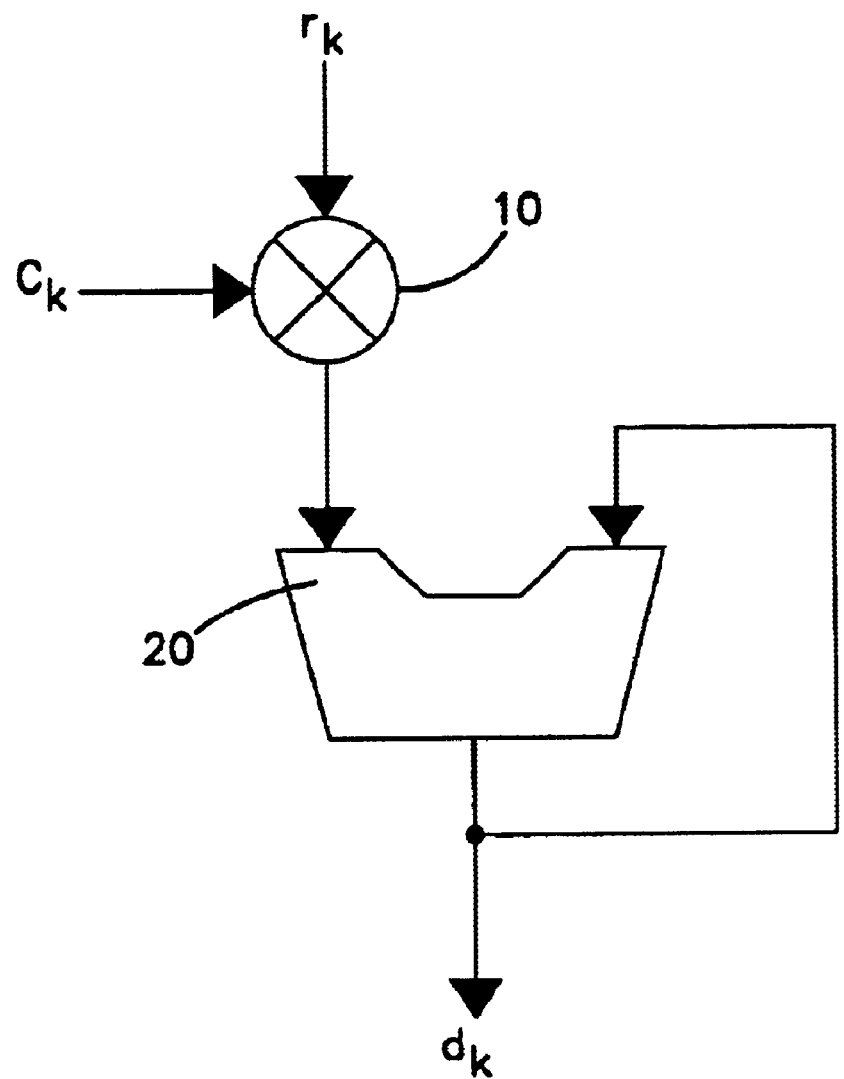

There is shown in FIG. 1 the active correlator, in which a spread signal $r_k$ at a receiving stage of a base station or a mobile station is inputted into a multiplier 10 by one chip, then the inputted spread signal is logically multiplied in recursive pattern with a pseudo random code $c_k$ stored in the multiplier 10 over a predetermined times. The multiplied result is added accumulatively over a predetermined times by means of an accumulator 20, in which initial synchronization may be acquired from a maximum added value out of the accumulated values $d_k$.

Figure 2:
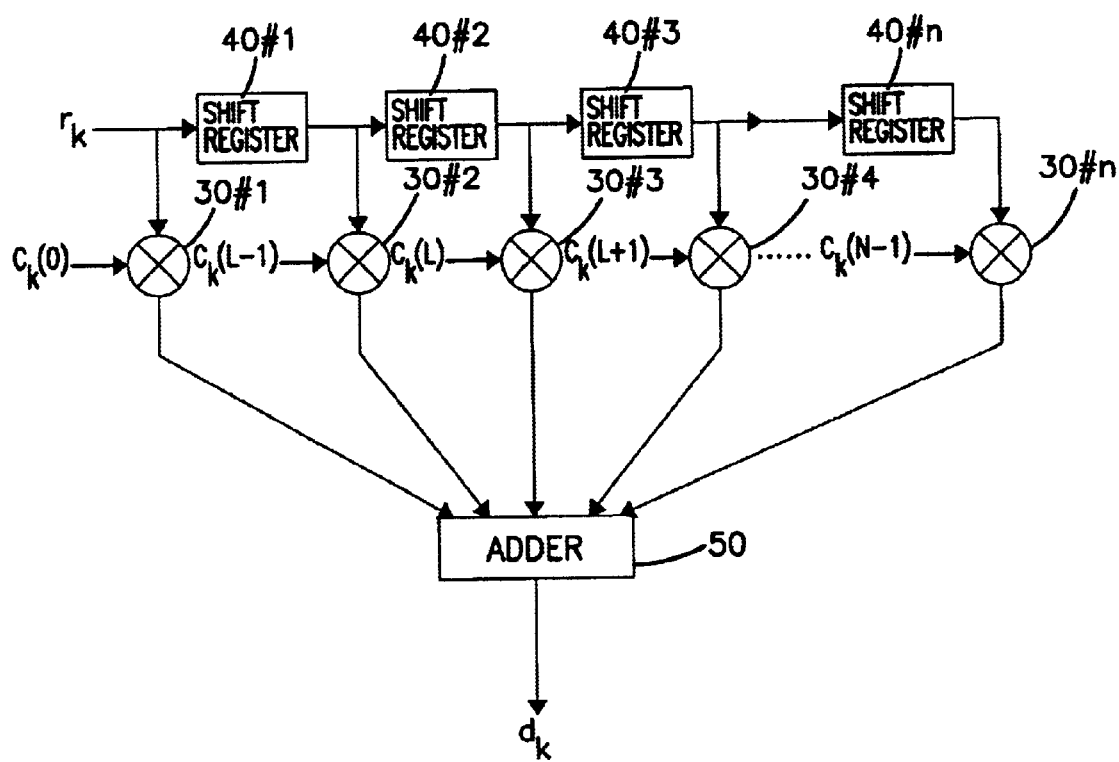

Further, referring now to the operation of the passive correlator shown in FIG. 2, all the chips of received spread signal $r_k$ are shifted in turn in a plurality of shift registers 40#1–40#n, which respectively output the shifted chips of the spread signal $r_k$ into a plurality of multipliers 30#1–30#n, which each logically multiply the shifted chips from the shift registers 40#1–40#n by each pseudo random code $C_k(0)$–$C_k(N-1)$ stored therein and output the multiplied results into an adder 50. Then, the adder 50 receives the multiplied results from the multipliers 30#1–30#n and adds in recursive pattern them over a predetermined times, in which initial synchronization may be acquired from a maximum added value out of the accumulated values $d_k$.

The active correlator, however, has the problem that causes to prolong initial synchronization time as it processes repeatedly the spread signal to be received by process gain (chip numbers to be multiplied to one bit) of the spread signal. Whereas the passive correlator has the effect that remarkably reduces the initial synchronization time as all the chips of the spread signal are processed simultaneously, but complex construction.

Also, there is disclosed in the U.S. Pat. No. 5,768,306, a sliding correlator used in CDMA systems to establish initial synchronization has memory circuit to store a received signal, to read the received signal at a frequency substantially higher than the storing rate of the received signal and to use the received signal for synchronization, and thereby to reduce initial synchronization time.

The U.S. patent includes the steps of storing the received signal in the memory circuit, reading the received signal at a frequency higher than the strong rate of the received signal, multiplying the received signal by a replica of a spreading code sequence by means of a multiplier, accumulating the output signal of the multiplier by an accumulator over a predetermined time period, deciding the output of the accumulator by a threshold detector whether or not it exceeds a predetermined threshold, shifting the phase of the spreading code sequence when the output of the threshold detector is less than the threshold, and repeating the detection process.

The correlator of the U.S. patent also has the effect that reduces the initial synchronization time, but complex construction.

SUMMARY OF THE INVENTION

It is therefore an object of the present invention to provide a complex type correlator in the CDMA system and initial synchronization acquiring method using the same capable of reducing an initial synchronization time while realizing a simple correlator.

In accordance with one aspect of the invention, there is provided a correlator for acquiring initial synchronization, from inputted spread signal of N chips per one bit, that is provided in receiving stages of a base station and a mobile station in a CDMA system characterized by:

a plurality of shift registers for each shifting in turn a spread signal to be received and outputting the shifted signal;

a plurality of multipliers each having a pseudo random code for each logically multiplying the associated shifted spread signal from each shift register by the associated pseudo random code stored therein and outputting the multiplied result;

an adder for adding the multiplied results from each multipliers; and an accumulator accumulatively adding the added results from the adder over a predetermined times and outputting the accumulated added results.

Also, in accordance with one aspect of the invention, there is provided a method for acquiring initial synchronization using a correlator for acquiring initial synchronization, from inputted spread signal of N chips per one bit, that is provided in receiving stages of a base station and a mobile station in a CDMA system characterized by: the steps of:

shifting in turn a predetermined chips out of a spread signal to be received and outputting the shifted chips, by means of a plurality of shift registers;

logically multiplying each shifted chip from the shift registers by each pseudo random code which is stored in a plurality of multipliers, by means of the multipliers;

adding the multiplied results from the multipliers, by means of an adder;

repeatedly performing accumulative adding the added results from the adder over a predetermined times and outputting the accumulated added results, by means of an accumulator; and comparing accumulated added results for the all bits of the received spread signal from the accumulator with each other and finding a bit having the most result.

BRIEF DESCRIPTION OF THE DRAWINGES

Figure 3:
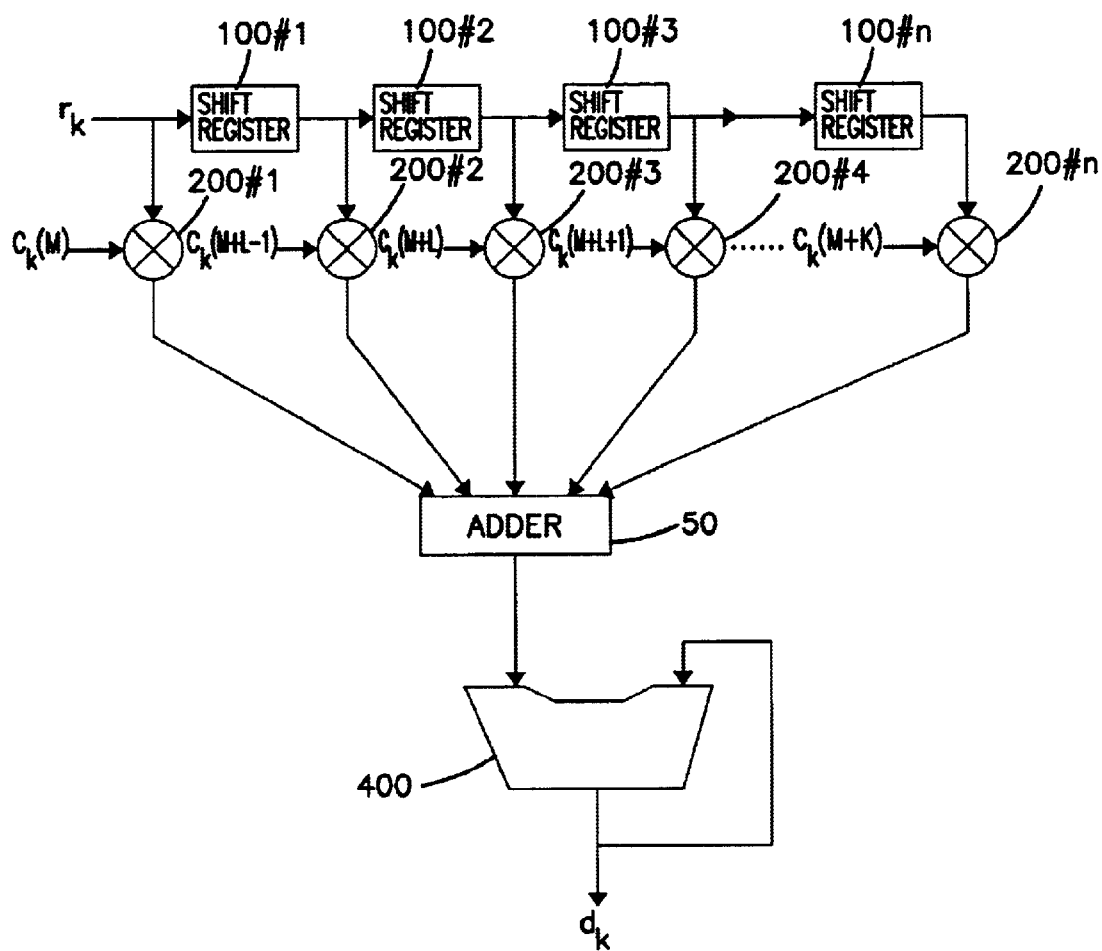
Figure 4:
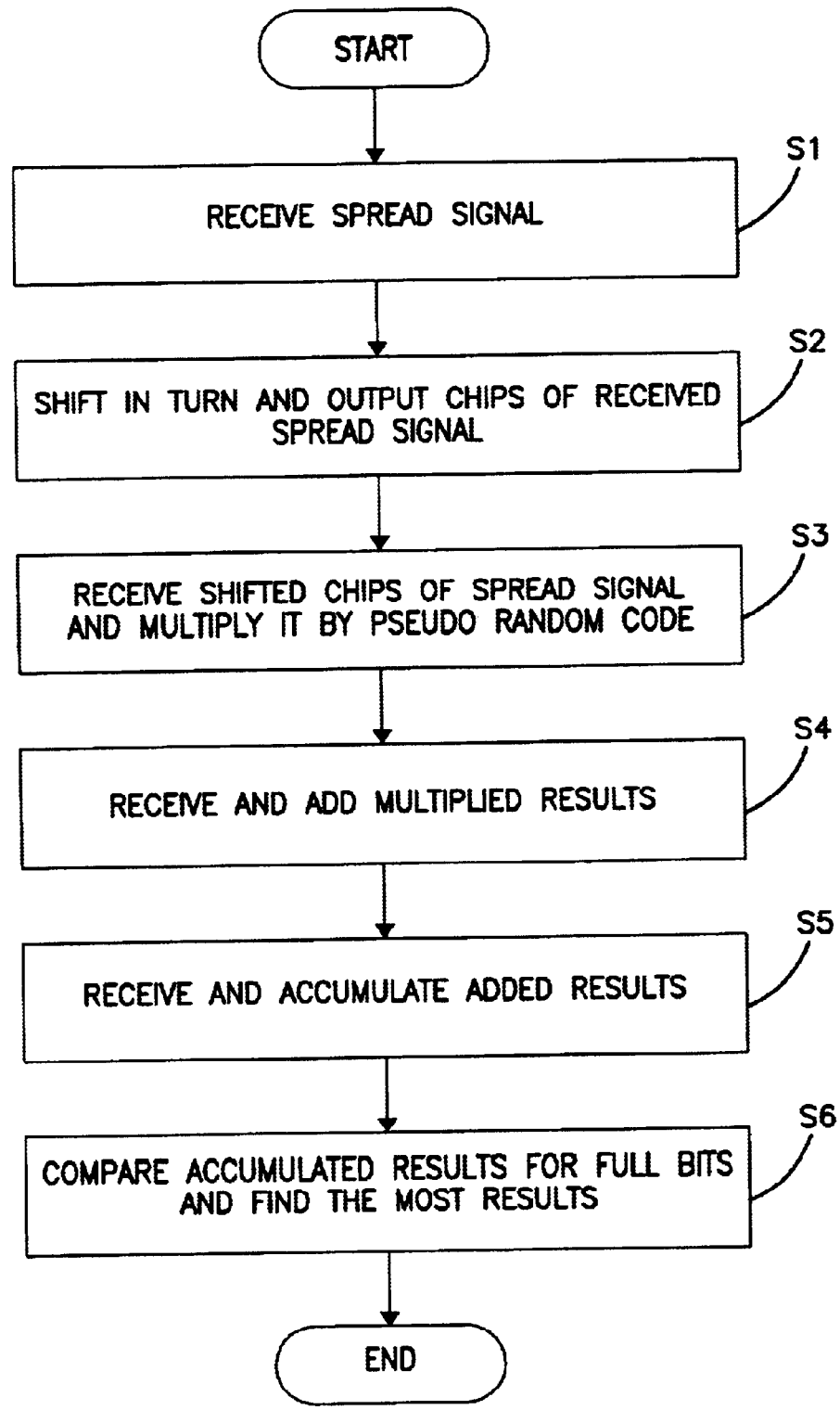

The invention disclosed herein will be understood better with reference to the following drawing of which:

FIG. 1 is a block diagram for structure of an active correlator in a CDMA system in the prior art, FIG. 2 is a block diagram for structure of an passive correlator in a CDMA system in the prior art, FIG. 3 is a complex type correlator in the CDMA system according to one preferred embodiment of the present invention, and FIG. 4 is a flow chart for acquiring initial synchronization using a complex type correlator in the CDMA system according to one preferred embodiment of the present invention.

DETALED DESCRIPTION OF THE PREFERRED EMBODIMENTS

Hereinbelow, detailed embodiments of a complex type correlator in the CDMA system and initial synchronization acquiring method using the same of the present invention will be described in detail with reference to accompanying drawings.

Referring to FIG. 3, there is shown a complex type correlator in the CDMA system according to one preferred embodiment of the present invention, in which the correlator includes a plurality of shift registers 100#1–100#n, a plurality of shift registers 100#1–100#n, an adder 300 and an accumulating adder 400.

Assuming that a spread signal $r_k$ to be received at a receiving stage of CDMA system is composed of N chips per one bit, the shift registers 100#1–100#n are composed of numbers smaller than N chips. Each shift register shifts the spread signal $r_k$ in turn and outputs the shifted spread signal to associated one of the multipliers 200#1–200#n.

Also, a predetermined chips may be arranged in turn from the shift register 100#1 to the shift register 100#n.

The numbers of the multipliers 200#1–200#n is 1more than the numbers of the shift registers 100#1–100#n. Each the multipliers 200#1–200#n receives and logically multiplies the chips of the shifted spread signal from each of the shift registers 100#1–100#n by each of pseudo random codes $C_k(M)$–$C_k(M+K)$ stored therein and outputs multiplied result to the adder 300.

The adder 300 adds each multiplied result from the multipliers 200#1–200#n.

Also, the accumulator 400 receives the added result from the adder 300, acumulatively adds the added result over a predetermined times (value that divides full chips for one bit by the numbers of the multipliers) and outputs accumulated result $d_k$.

Numbers to be processed in the shift registers 100#1–100#n, the multipliers 200#1–200#n and the adder 300 are equal to numbers to be processed in the accumulating adder 400.

The correlator of the present invention may be adaptable to receiving stages of a base station and a mobile station.

FIG. 4 illustrates a flow chart for acquiring initial synchronization using a complex type correlator in the CDMA system according to one preferred embodiment of the present invention.

Initial synchronization acquiring method using the correlator of the present invention will be described in detail with reference to FIGS. 3 and 4.

First of all, if a predetermined chips of the spread signal $r_k$ are inputted into the shift register 100#1(S1), the shift register 100#1 shifts and arranges the received chips and outputs it to the multiplier 200#1. Finally, the shift register 100#n shifts and arranges the received chips from a preceding shift register and outputs it to the shift register 200#n (S2).

Then, the multiplier 200# 1 receives the chips of the spread signal $r_k$ and logically multiplies the chips by the pseudo random code $C_k(M)$ stored therein and outputs the multiplied result to the adder 300. Finally, the multipliers 200# n receives the shifted chips from the shift register 100#n and logically multiplies the shifted chips by the pseudo random code $C_k(M)$ stored therein and outputs the multiplied result to the adder 300(S3). The adder 300 receives and adds each multiplied result from the multipliers 200#1–200#n, and outputs the added result to the accumulating adder 400(S4).

The accumulator 400 receives the added result from the adder 300, recursively performs accumulative adding process over a predetermined times (value that divides full chips for one bit by the numbers of the multipliers) and outputs accumulated result $d_k$(S5). Accumulated results from the accumulating adder 400 for full bits of the received spread signal are compared with each other and initial synchronization is acquired from the most accumulated result (S6).

Numbers to be processed in the shift registers 100#1–100#n and the multipliers 200#1–200#n in the steps S1, S2, S3 and S4 are equal to accumulative adding numbers to be processed in the accumulating adder 400.

In addition, it is possible to get desired initial synchronization time and component numbers of the correlator of the present invention by properly regulating the numbers of the shift registers 100#1–100#n.

As fully described hereinabove, the correlator of the present invention has a plurality of shift registers that each shift received spread signals, a plurality of multipliers that each multiply the shifted spread signal by each pseudo random code stored therein, an adder that adds the multiplied results from the multipliers, and an accumulating adder that adds in recursive pattern the added result from the adder over a predetermined times.

Accordingly, the present invention has the effect that reduces initial synchronization time while realizing simple structure.

It is further understood by those skilled in the art that the foregoing description is a preferred embodiment of the disclosed device and method and that various changes and modifications may be made in the invention without departing from the spirit and scope thereof.

What is claimed is:

1. A method for acquiring initial synchronization using a correlator for acquiring initial synchronization, from inputted spread signal of N chips per one bit, that is provided in receiving stages of a base station and a mobile station in a CDMA system characterized by the steps of:

shifting in turn a predetermined chips out of a spread signal to be received and outputting the shifted chips, by means of a plurality of shift registers;

logically multiplying each shifted chip from the shift registers by each pseudo random code which is stored in a plurality of multipliers, by means of the multipliers;

adding the multiplied results from the multipliers, by means of an adder;

repeatedly performing accumulative adding the added results from the adder over a predetermined times and outputting the accumulated added results, by means of an accumulator; and comparing accumulated added results for the all bits of the received spread signal from the accumulator with each other and finding a bit having the most result.

2. A method for acquiring initial synchronization using a complex type correlator as claimed in claim 1, wherein the shifting step, the multiplying step and the adding step are repeatedly performed as much as accumulative adding times in the accumulative adding step.

3. A method for acquiring initial synchronization using a complex type correlator as claimed in claim 1, wherein the predetermined times is a value that divides full chips for one bit by the numbers of the multipliers.

* * * * *